(12) United States Patent
Ly et al.

(10) Patent No.: US 12,342,279 B2
(45) Date of Patent: Jun. 24, 2025

(54) CELL ACTIVE TIME CONFIGURATION

(71) Applicant: QUALCOMM Incorporated, San Diego, CA (US)

(72) Inventors: Hung Dinh Ly, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/659,813

(22) Filed: Apr. 19, 2022

(65) Prior Publication Data

US 2023/0337133 A1    Oct. 19, 2023

(51) Int. Cl.
  *H04W 52/02* (2009.01)
  *H04L 27/26* (2006.01)
  *H04W 68/00* (2009.01)
  *H04W 74/0833* (2024.01)

(52) U.S. Cl.
  CPC ... *H04W 52/0229* (2013.01); *H04L 27/26025* (2021.01); *H04W 52/0216* (2013.01); *H04W 68/005* (2013.01); *H04W 74/0833* (2013.01)

(58) Field of Classification Search
  None
  See application file for complete search history.

(56) References Cited

U.S. PATENT DOCUMENTS

| | | | | |
|---|---|---|---|---|
| 2007/0066273 | A1* | 3/2007 | Laroia | H04W 52/0235 455/343.2 |
| 2009/0285143 | A1* | 11/2009 | Kwun | H04W 52/0229 370/311 |
| 2013/0189932 | A1* | 7/2013 | Shen | H04W 52/0232 455/561 |
| 2017/0048918 | A1* | 2/2017 | Iwamura | H04W 76/27 |
| 2024/0107450 | A1* | 3/2024 | Wei | H04W 76/27 |

FOREIGN PATENT DOCUMENTS

| | | | | |
|---|---|---|---|---|
| EP | 2941063 | A1 | 11/2015 | |
| WO | WO-2014056174 | A1 * | 4/2014 | ........ H04W 52/0206 |
| WO | WO-2014179921 | A1 * | 11/2014 | ........ H04W 52/0206 |
| WO | WO-2023048634 | A1 * | 3/2023 | ........ H04W 52/0206 |

OTHER PUBLICATIONS

International Search Report and Written Opinion—PCT/US2023/016264—ISA/EPO—Jun. 23, 2023.

* cited by examiner

*Primary Examiner* — Jamaal Henson
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, first signaling identifying a configuration for a set of wake up occasions associated with an active state of the network entity. The UE may transmit, to the network entity, a wake up signal to transition the network entity from an inactive state to the active state based on the configuration for the set of wake up occasions. The UE may receive, from a network entity, second signaling identifying a cell active time during which the network entity remains in the active state. Numerous other aspects are described.

30 Claims, 10 Drawing Sheets

CELL ACTIVE TIME CONFIGURATION

FIELD OF THE DISCLOSURE

Aspects of the present disclosure generally relate to wireless communication and to techniques and apparatuses for cell active time configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, first signaling identifying a configuration for a set of wake up occasions associated with an active state of the network entity. The method may include transmitting, to the network entity, a wake up signal to transition the network entity from an inactive state to the active state based on the configuration for the set of wake up occasions. The method may include receiving, from a network entity, second signaling identifying a cell active time during which the network entity remains in the active state.

Some aspects described herein relate to a method of wireless communication performed by a network entity. The method may include transmitting first signaling identifying a configuration for a set of wake up occasions associated with an active state of the network entity. The method may include receiving a wake up signal indicating a transition from an inactive state to the active state. The method may include transmitting second signaling identifying a cell active time during which the network entity remains in the active state.

Some aspects described herein relate to a UE for wireless communication. The user equipment may include a memory and one or more processors coupled to the memory. The one or more processors may be configured to receive, from a network entity, first signaling identifying a configuration for a set of wake up occasions associated with an active state of the network entity. The one or more processors may be configured to transmit, to the network entity, a wake up signal to transition the network entity from an inactive state to the active state based on the configuration for the set of wake up occasions. The one or more processors may be configured to receive, from a network entity, second signaling identifying a cell active time during which the network entity remains in the active state.

Some aspects described herein relate to a network entity for wireless communication. The network entity may include a memory and one or more processors coupled to the memory. The one or more processors may be configured to transmit first signaling identifying a configuration for a set of wake up occasions associated with an active state of the network entity. The one or more processors may be configured to receive a wake up signal indicating a transition from an inactive state to the active state. The one or more processors may be configured to transmit second signaling identifying a cell active time during which the network entity remains in the active state.

Some aspects described herein relate to a non-transitory computer-readable medium that stores a set of instructions for wireless communication by a UE. The set of instructions, when executed by one or more processors of the UE, may cause the UE to receive, from a network entity, first signaling identifying a configuration for a set of wake up occasions associated with an active state of the network entity. The set of instructions, when executed by one or more processors of the UE, may cause the UE to transmit, to the network entity, a wake up signal to transition the network entity from an inactive state to the active state based on the configuration for the set of wake up occasions. The set of instructions, when executed by one or more processors of the UE, may cause the UE to receive, from a network entity, second signaling identifying a cell active time during which the network entity remains in the active state.

Some aspects described herein relate to a non-transitory computer-readable medium that stores a set of instructions for wireless communication by a network entity. The set of instructions, when executed by one or more processors of the network entity, may cause the network entity to transmit first signaling identifying a configuration for a set of wake up occasions associated with an active state of the network entity. The set of instructions, when executed by one or more processors of the network entity, may cause the network entity to receive a wake up signal indicating a transition from an inactive state to the active state. The set of instructions, when executed by one or more processors of the network entity, may cause the network entity to transmit second signaling identifying a cell active time during which the network entity remains in the active state.

Some aspects described herein relate to an apparatus for wireless communication. The apparatus may include means for receiving, from a network entity, first signaling identifying a configuration for a set of wake up occasions associated with an active state of the network entity. The apparatus may include means for transmitting, to the network entity, a wake up signal to transition the network entity from an inactive state to the active state based on the configuration for the set of wake up occasions. The apparatus may include means for receiving, from a network entity, second signaling identifying a cell active time during which the network entity remains in the active state.

Some aspects described herein relate to an apparatus for wireless communication. The apparatus may include means for transmitting first signaling identifying a configuration for a set of wake up occasions associated with an active state of the network entity. The apparatus may include means for receiving a wake up signal indicating a transition from an inactive state to the active state. The apparatus may include means for transmitting second signaling identifying a cell active time during which the network entity remains in the active state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
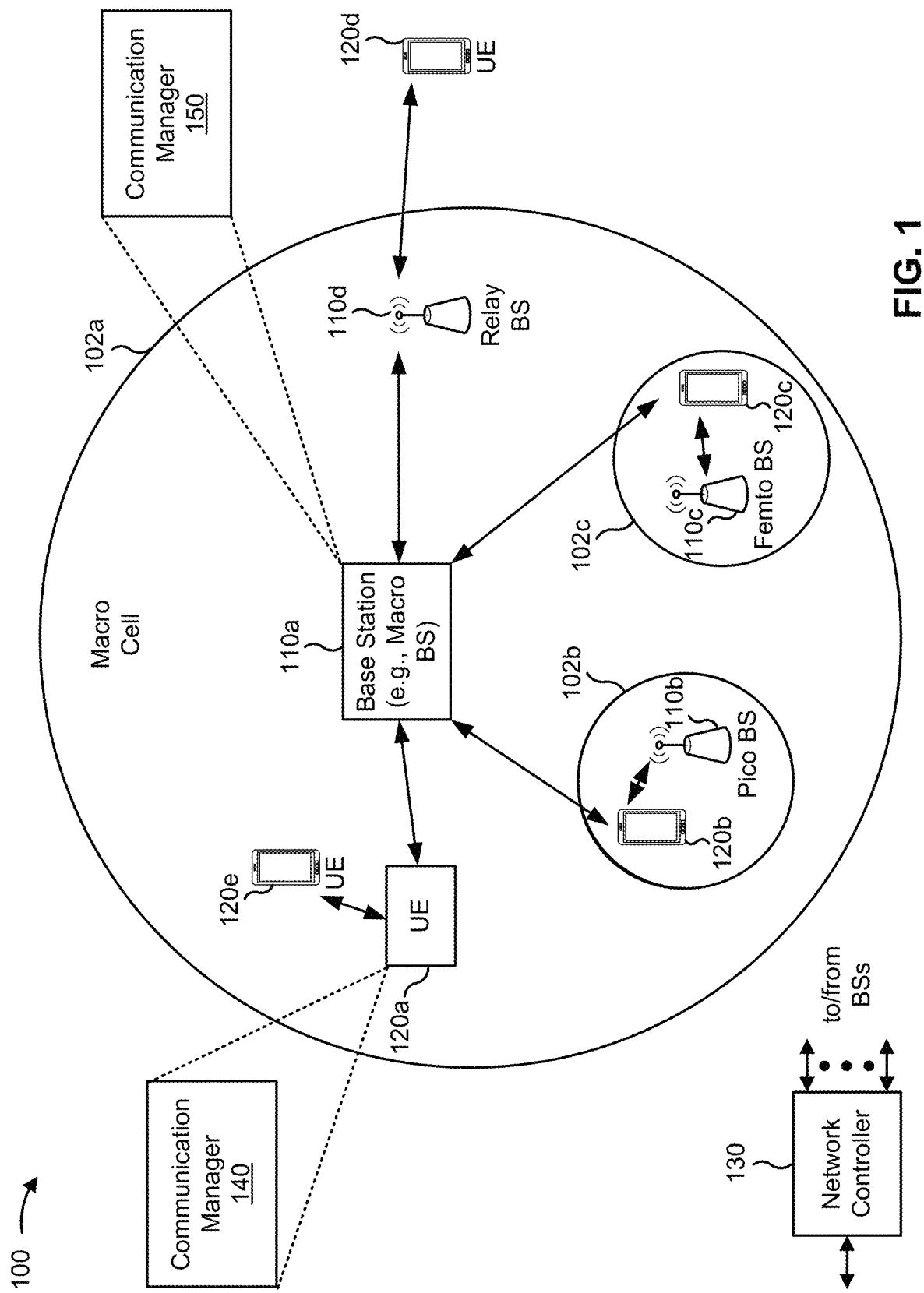
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, first signaling identifying a configuration for a set of wake up occasions associated with an active state of the network entity; transmit, to the network entity, a wake up signal to transition the network entity from an inactive state to the active state based on the configuration for the set of wake up occasions; and receive, from a network entity, second signaling identifying a cell active time during which the network entity remains in the active state. Additionally, or alternatively, the communication manager 140 may perform one or more other operations described herein.

In some aspects, a network entity (e.g., the base station 110) may include a communication manager 150. As described in more detail elsewhere herein, the communication manager 150 may transmit first signaling identifying a configuration for a set of wake up occasions associated with an active state of the network entity; receive a wake up signal indicating a transition from an inactive state to the active state; and transmit second signaling identifying a cell active time during which the network entity remains in the active state. Additionally, or alternatively, the communication manager 150 may perform one or more other operations described herein.

As indicated above, FIG. 1 is provided as an example. Other examples may differ from what is described with regard to FIG. 1.

Figure 2:
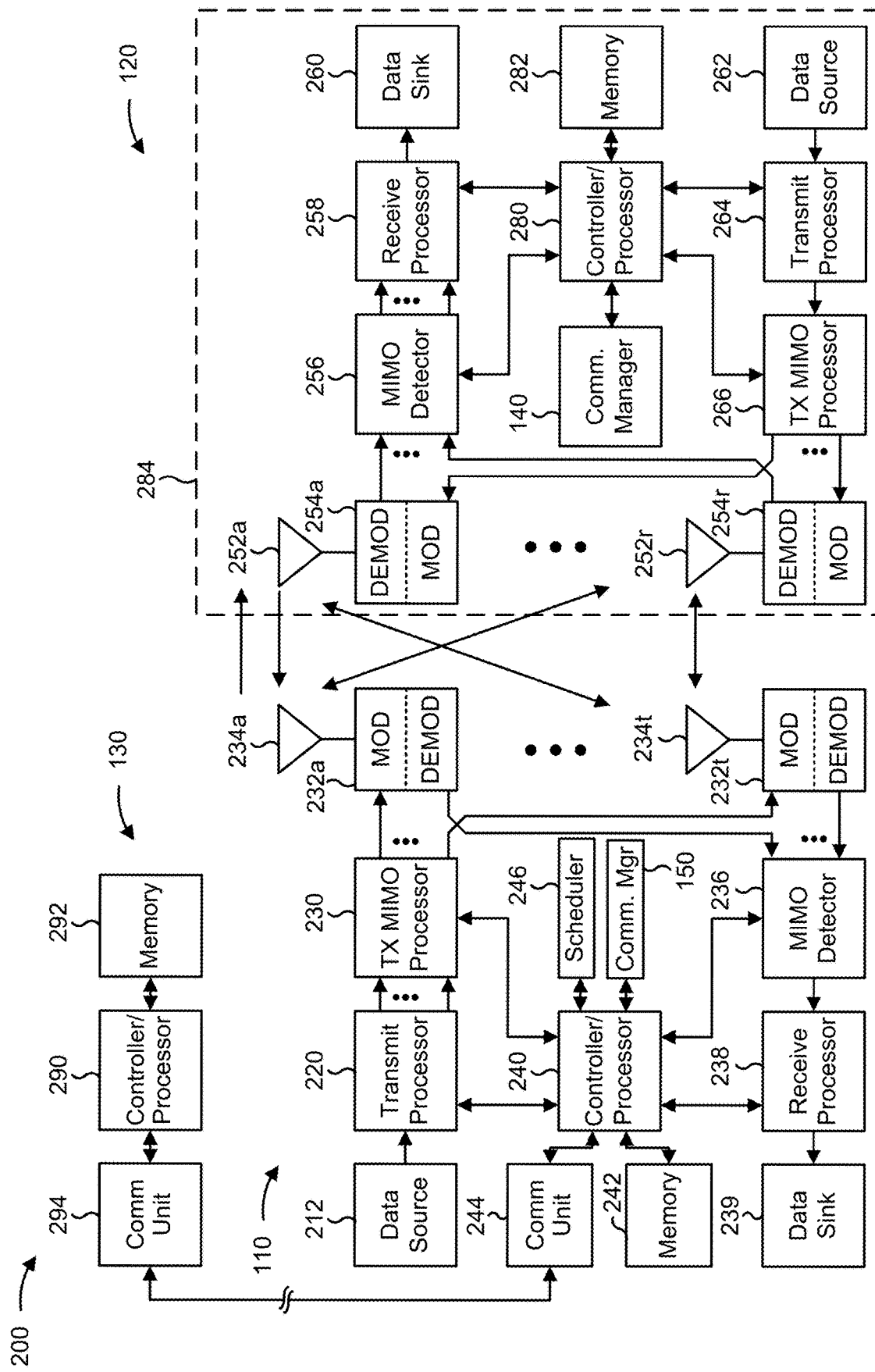
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with cell active time configuration, as described in more detail elsewhere herein. In some aspects, the network entity described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity, first signaling identifying a configuration for a set of wake up occasions associated with an active state of the network entity; means for transmitting, to the network entity, a wake up signal to transition the network entity from an inactive state to the active state based on the configuration for the set of wake up occasions; and/or means for receiving, from a network entity, second signaling identifying a cell active time during which the network entity remains in the active state. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the base station 110) includes means for transmitting first signaling identifying a configuration for a set of wake up occasions associated with an active state of the network entity; means for receiving a wake up signal indicating a transition from an inactive state to the active state; and/or means for transmitting second signaling identifying a cell active time during which the network entity remains in the active state. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
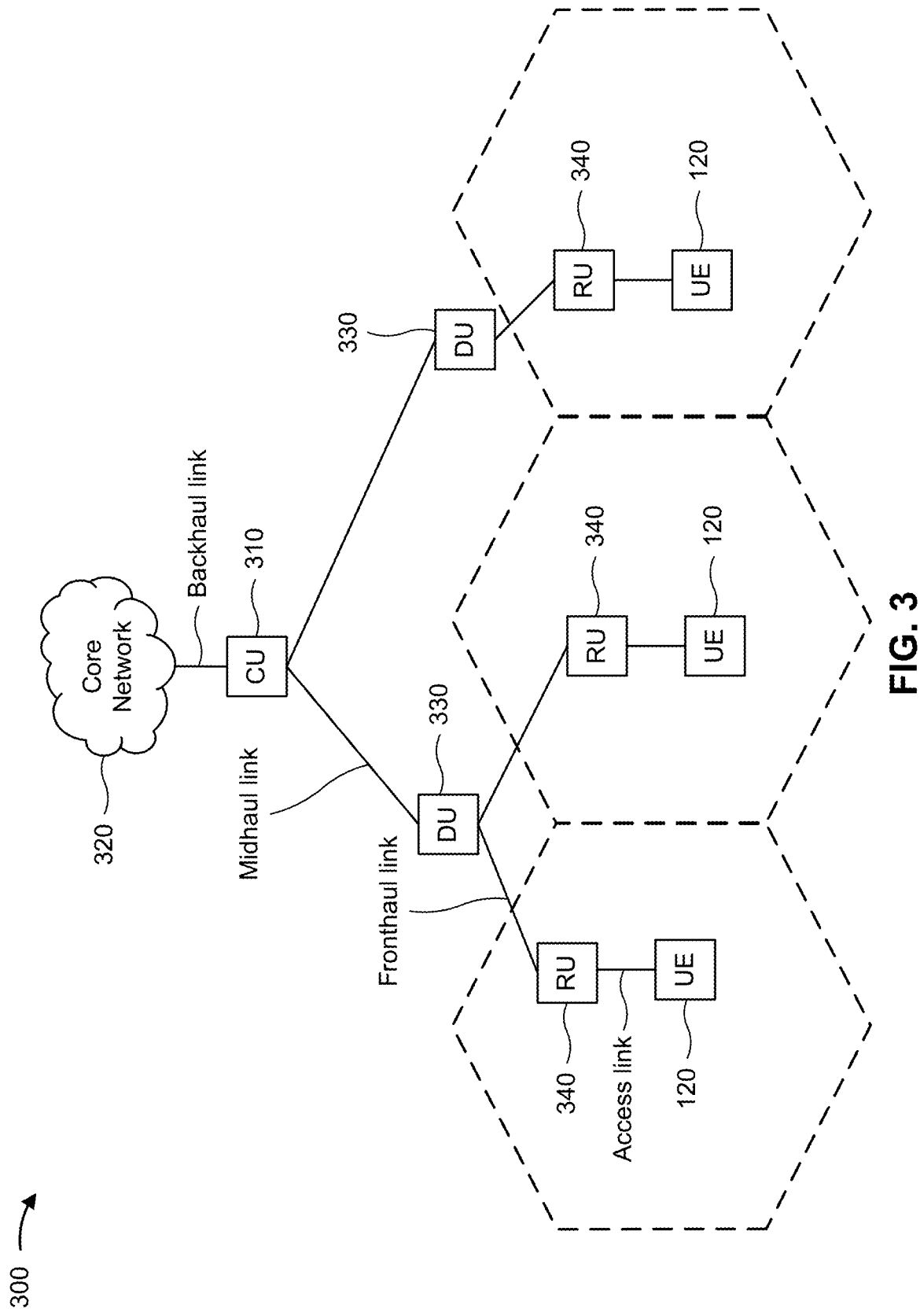
FIG. 3 is a diagram illustrating an example of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
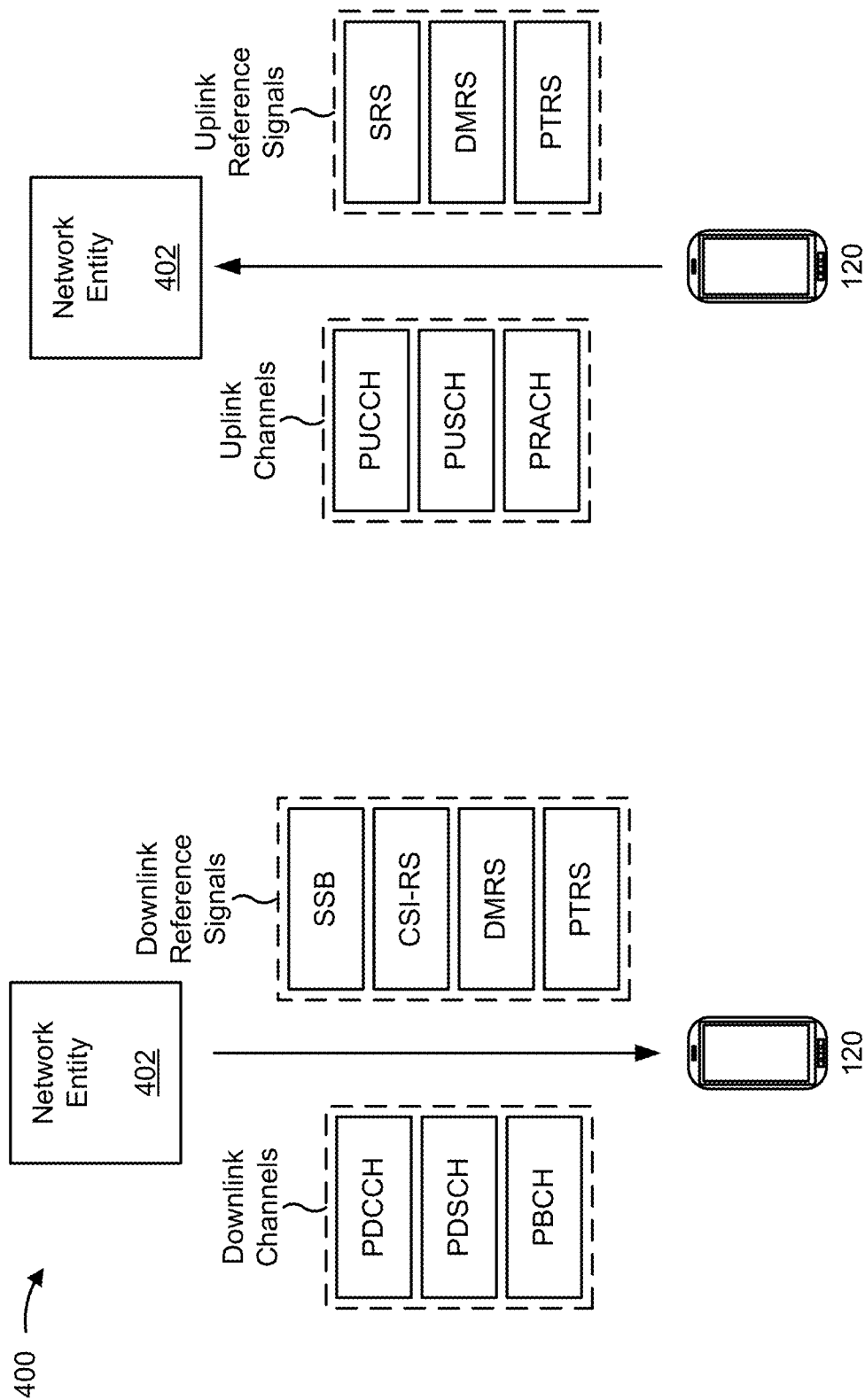
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network entity 402 to a UE 120, and uplink channels and uplink reference signals may carry information from the UE 120 to the network entity 402.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The network entity 402 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 402 may configure a set of CSI-RSs for the UE 120, and the UE 120 may measure the configured set of CSI-RSs. Based at least in part on the measurements, the UE 120 may perform channel estimation and may report channel estimation parameters to the network entity 402 (e.g., in a CSI report), such as a CQI, a precoding matrix indicator (PMI), a CSI-RS resource indicator (CRI), a layer indicator (LI), a rank indicator (RI), or an RSRP, among other examples. The network entity 402 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 402 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The network entity 402 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 402 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 402 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
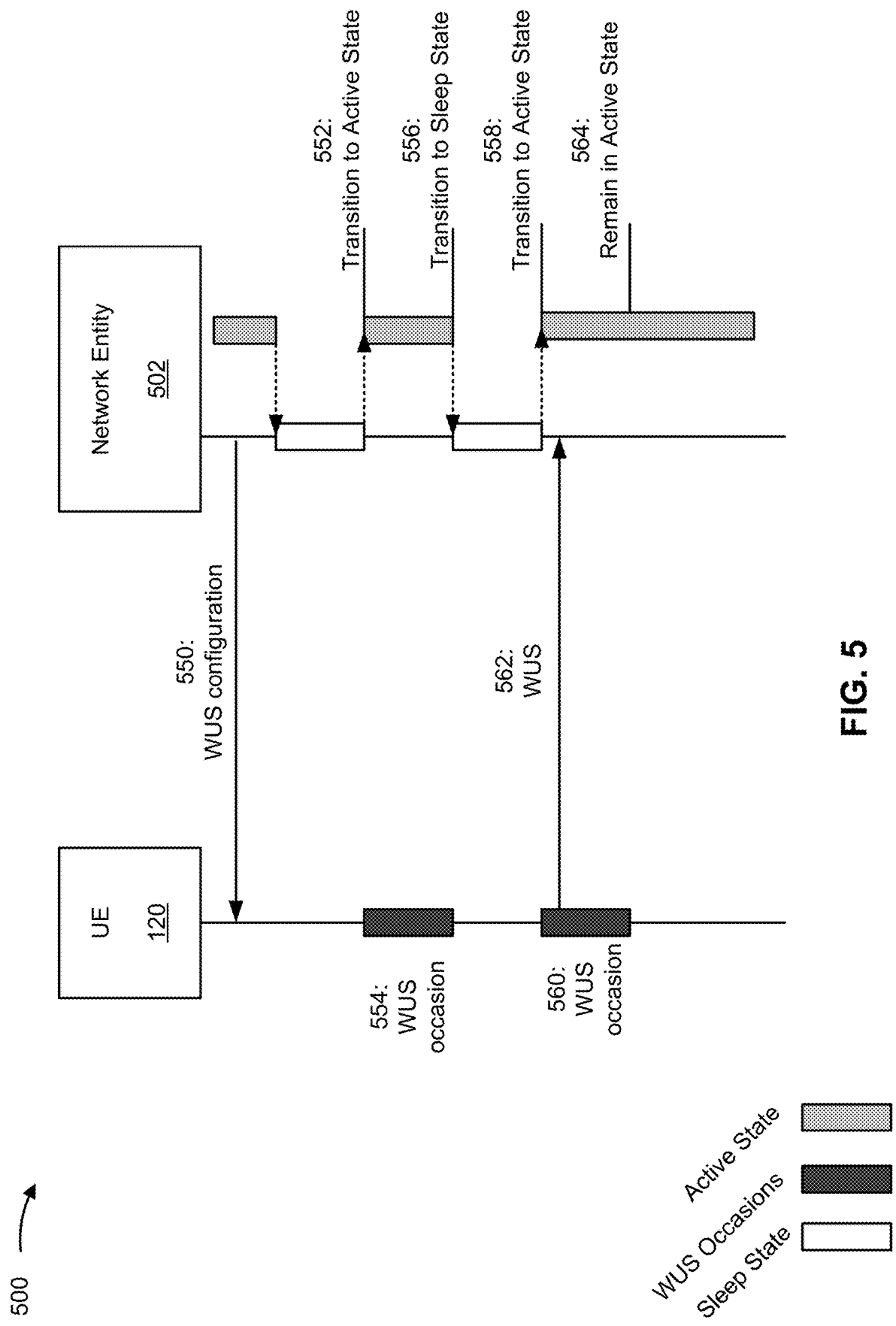
FIG. 5 is a diagram illustrating an example of wake up signaling, in accordance with the present disclosure.

FIG. 5 is a diagram of an example 500 of wake up signaling, in accordance with the present disclosure. As shown in FIG. 5, a network entity 502 (e.g., a base station 110) may communicate with a UE 120.

As shown by reference number 550, the network entity 502 may transmit, to the UE 120, information identifying a wake up signal (WUS) configuration. For example, the network entity 502 may transmit information indicating a first set of periods in which the network entity 502 is to operate in a low power mode or a power saving mode (e.g., a sleep state or an inactive state) and a second set of periods in which the network entity 502 is to operate in a non-low power mode, non-power saving mode, or a normal power mode (e.g., an active state or an awake state). Additional details regarding power saving modes or states are described with regard to 3GPP Technical Reports (TRs) 32.826, 36.887, 36.927, 37.816, and 21.866, among other examples. The network entity 502 may transmit the information identifying the wake up signal configuration during operation in an active state and may, after expiration of a timer associated with the active state, transition to a sleep state to reduce power consumption.

As shown by reference number 552, after a period of time in the sleep state, the network entity 502 may transition to an active state. For example, the network entity 502 may activate one or more antennas or antennas panels, which were inactive during operation in the sleep state, to enable the network entity 502 to receive communications from the UE 120. The UE 120 may have a WUS occasion aligned to the active state of the network entity 502, as shown by reference number 554. For example, the UE 120 may configure wake up signaling occasions based at least in part on the wake up signal configuration, received from the network entity 502, that identifies when the network entity 502 is to be in the active state. In this case, as shown, the UE 120 does not transmit a wake up signal to the network entity 502 during the active state. Accordingly, after expiration of a timer associated with the active state (e.g., at a scheduled time), the network entity transitions from the active state to the sleep state to reduce power consumption, as shown by reference number 556.

As shown by reference number 558 and 560, after a period of time in the sleep state, the network entity 502 may transition back to the active state, and the UE 120 may have a wake up signaling occasion aligned to the active state. In this case, as shown by reference number 562, the UE 120 may transmit a wake up signal to the network entity 502. For example, the UE 120 may transmit a signal to trigger the network entity 502 to remain in the active state for an additional duration (e.g., to enable the UE 120 to communicate with the network entity 502). As shown by reference number 564, rather than transitioning to the sleep state at a scheduled period of time, the network entity 502 remains in the active state based at least in part on the wake up signal from the UE 120. In this way, the network entity 502 can conserve power resources when the UE 120 does not have information to transmit to the network entity 502, but the network entity 502 can end the conservation of power resources when the UE 120 does have information to transmit to the network entity 502.

As indicated above, FIG. 5 is provided as an example. Other examples may differ from what is described with respect to FIG. 5.

At some periods of time, a network may have relatively little traffic or no traffic in a cell. However, at such times, a network entity (e.g., a base station) of the cell may still periodically transmit some communications and receive other communications. For example, even during low traffic periods, a network entity may periodically transmit a broadcast signal or channel, such as an SSB or system information (SI) transmission. Such periodic transmissions may enable a UE to obtain access to network services. The network entity may also periodically monitor for transmissions from the UE, such as monitoring PRACH occasions for random access channel (RACH) transmissions or small data transmission (SDT) communications from the UE. The network entity may be in an active mode to transmit the periodic transmissions and/or to monitor for transmissions from a UE. However, in between periodic transmissions and/or PRACH occasions, the network entity may not have data to transmit or expect to receive transmissions. Accordingly, the network entity may transition to a power saving mode to reduce power consumption, as described above. One example of a power saving mode, for UEs, is a connected discontinuous reception (CDRX) sleep state. A network entity, such as a base station, may have a similar sleep state or inactive state. In a sleep state, the network entity may deactivate one or more antennas, processors, or other components to reduce power consumption. When the network entity is scheduled to transmit a periodic communication or monitor for a transmission, the network entity transitions back to an active state (e.g., activating the one or more antennas, processors or other components) to enable transmission or reception.

The network entity may stop or slow down the periodic transmissions and the periodic monitoring based at least in part on a load on a network. For example, when network traffic is low or absent, the network entity may configure longer or more frequent periods of time for the sleep state and shorter or less frequent periods of time for the active state to further reduce power consumption without negatively impacting latency. However, when a UE needs to go into a connected state or transmit data, a shortened or infrequent active state period may limit an amount of information that the UE can transmit to the base station. Accordingly, the UE may transmit a wake up signal to proactively wake up the network entity and cause the network entity to extend an active state period, as described above. In this case, the extended active state period enables the UE to communicate with the network entity, thereby improving network throughput relative to a fixed set of active state periods.

However, when a first UE transmits a wake up signal and a network entity extends an active state period accordingly, the first UE may not have information indicating how long the network entity will remain in the active state for communication with the first UE. As a result, the first UE may not be able to optimize use of the active state for communication (e.g., the first UE may forgo transmission during some of the active state or may continue transmitting after a transition back to the sleep state). Additionally, a second UE may not have information indicating that the active state period is extended, and the second UE may transmit another wake up signal, even though the active state period has already been extended, thereby using network resources unnecessarily.

Some aspects described herein enable cell active time configuration. For example, a network entity may receive a wake up signal and may transmit information identifying a cell active time (e.g., an active state period) in which the network entity will remain in a non-power saving mode (e.g., an active state). In this case, a UE may receive the information identifying the cell active time and may communicate with the network entity during the cell active time and/or suppress a transmission of a wake up signal during the cell active time. For example, rather than transmitting a wake up signal during an active state period in which the network entity is already in the active state for a configured duration, the UE may forgo transmission, transmit other communications, or receive other communications, thereby improving a network resource usage efficiency relative to transmitting unnecessary wake up signals or failing to optimize usage of the cell active time, as described above.

Figure 6:
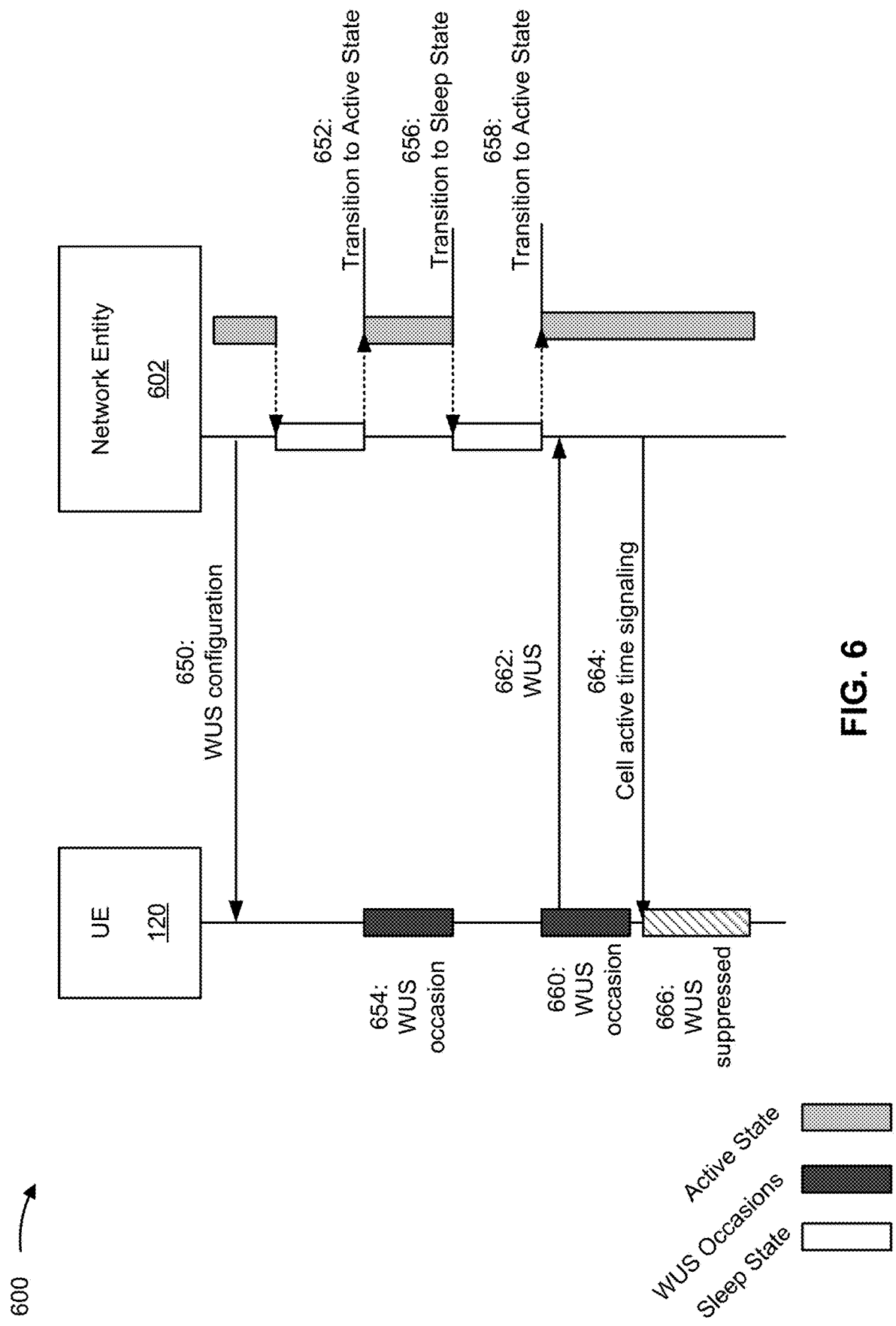
FIG. 6 is a diagram illustrating an example associated with cell active time configuration, in accordance with the present disclosure.

FIG. 6 is a diagram of an example 600 associated with cell active time configuration, in accordance with the present disclosure. As shown in FIG. 6, a network entity 602 (e.g., a base station 110) may communicate with a UE 120.

As shown by reference number 650, the network entity 602 may transmit, to the UE 120, first signaling conveying information identifying a wake up signal configuration. For example, the network entity 602 may identify a first set of periods in which the network entity 602 will operate in a power saving mode (e.g., a sleep state or inactive state) and a second set of periods in which the network entity 602 will operate in a non-power saving mode (e.g., an awake state or an active state). In some aspects, the wake up signal configuration may include information identifying a set of cell active time durations. For example, the network entity 602 may transmit SI or RRC information identifying a set of configured cell active time durations. In this case, when the network entity 602 transmits an indication of a cell active time, as described below, the network entity 602 may transmit information identifying an index of a configuration cell active time duration of the set of configured cell active time durations. Additionally, or alternatively, the network entity 602 may transmit an indication of a set of wake up signal configurations and, when the network entity 602 transmits information identifying the cell active time, the network entity 602 may transmit information identifying a wake up signal configuration from which the UE 120 may derive the cell active time (e.g., the wake up signal configuration may include a periodicity, a duration, a subcarrier spacing, among other examples of parameters that the UE 120 may use to derive the cell active time).

As shown by reference numbers 652, 654, and 656, at a first time, the network entity 602 may transition to the active state and monitor for a wake up signal, may not receive the wake up signal, and may transition back to the sleep state. As shown by reference numbers 658, 660, and 662, at a second time, the network entity 602 may transition to the active state and monitor for a wake up signal and may receive the wake up signal during a wake up signaling occasion. For example, during the wake up signaling occasion, the UE 120 may transmit the wake up signal to trigger the network entity 602 to remain in the active state, which may enable the UE 120 to further communicate with the network entity 602.

As shown by reference number 664, the network entity 602 may transmit second signaling conveying information identifying a cell active time. For example, based at least in part on receiving the wake up signal, the network entity 602 may transmit information indicating a duration during which the network entity 602 is to remain in the active state. In some aspects, the network entity 602 may convey the information identifying the cell active time in a particular channel or message. For example, the network entity 602 may transmit DCI scheduling a paging PDSCH, and the DCI may include one or more information elements (IEs) to identify the cell active time. Additionally, or alternatively, the network entity 602 may convey the information identifying the cell active time in a paging message of a PDSCH or a paging early indication (PEI) transmission, among other examples. Additionally, or alternatively, the network entity 602 may convey the information identifying the cell active time in a dedicated reference signal or channel (e.g., that is configured for conveying information identifying a cell active time).

In some aspects, the network entity 602 may transmit the second signaling in connection with a RACH or PRACH procedure. For example, when the wake up signaling occasion is a PRACH occasion and the UE 120 transmits a PRACH transmission to convey the wake up signal (e.g., and to initiate a RACH procedure), the network entity 602 may transmit the information identifying the cell active time in a RACH message. For example, in a 4-step RACH procedure, the network entity 602 may convey the information identifying the cell active time in an msg2 PDCCH or PDSCH message or an msg4 PDCCH or PDSCH message. Additionally, or alternatively, in a 2-step RACH procedure, the network entity 602 may convey the information identifying the cell active time in an msgB PDCCH or PDSCH message.

In some aspects, the network entity 602 may identify the cell active time as a quantity of slots, a quantity of frames, or an absolute time (e.g., a quantity of milliseconds or seconds). For example, the network entity 602 may indicate that the cell active time is associated with a duration of an identified quantity of slots. Additionally, or alternatively, the network entity 602 may identify the cell active time using an index value. For example, when the network entity 602 configures a set of possible cell active time durations, the network entity 602 may transmit information identifying an index value corresponding to a cell active time duration of the set of possible cell active time durations.

In some aspects, the UE 120 may determine the cell active time duration based at least in part on the information identifying the cell active time duration. For example, the UE 120 may determine that the cell active time duration is a particular quantity of slots. In some aspects, the UE 120 may determine the cell active time duration based at least in part on a subcarrier spacing. For example, the UE 120 may use a subcarrier spacing of a channel on which the UE 120 receives the information identifying the cell active time to determine a duration of the cell active time. Additionally, or alternatively, the UE 120 may use a subcarrier spacing of the transmitted wake up signal or a subcarrier spacing indicated by the network entity 602 (e.g., in the first signaling identifying the wake up signal configuration or the second signaling conveying the information identifying the cell active time). Additionally, or alternatively, the UE 120 may determine a start of the cell active time based at least in part on a last symbol of the second signaling (e.g., in which the UE 120 receives the information identifying the cell active time), a last symbol of the wake up signal occasion, or another configuration for the start of the cell active time received from the network entity 602.

As shown by reference number 666, in some aspects, the UE 120 (or another UE 120) may suppress transmission of a wake up signal. For example, based at least in part on the information identifying the cell active time, the UE 120 (or another UE 120) may suppress transmission of a wake up signal during the cell active time, thereby reducing a utilization of network resources. In some aspects, suppressing the wake up signal may include forgoing transmission of a wake up signal (e.g., a wake up signal that would have been otherwise triggered by, for example, the UE 120 or another UE 120 having data for transmission to the network entity 602). Additionally, or alternatively, suppressing the wake up signal may include transmitting another transmission, forgoing any transmission, or receiving a transmission in a resource in which the wake up signal would have been transmitted (e.g., in a resource that would otherwise have been allocated for a wake up signal).

As indicated above, FIG. 6 is provided as an example. Other examples may differ from what is described with respect to FIG. 6.

Figure 7:
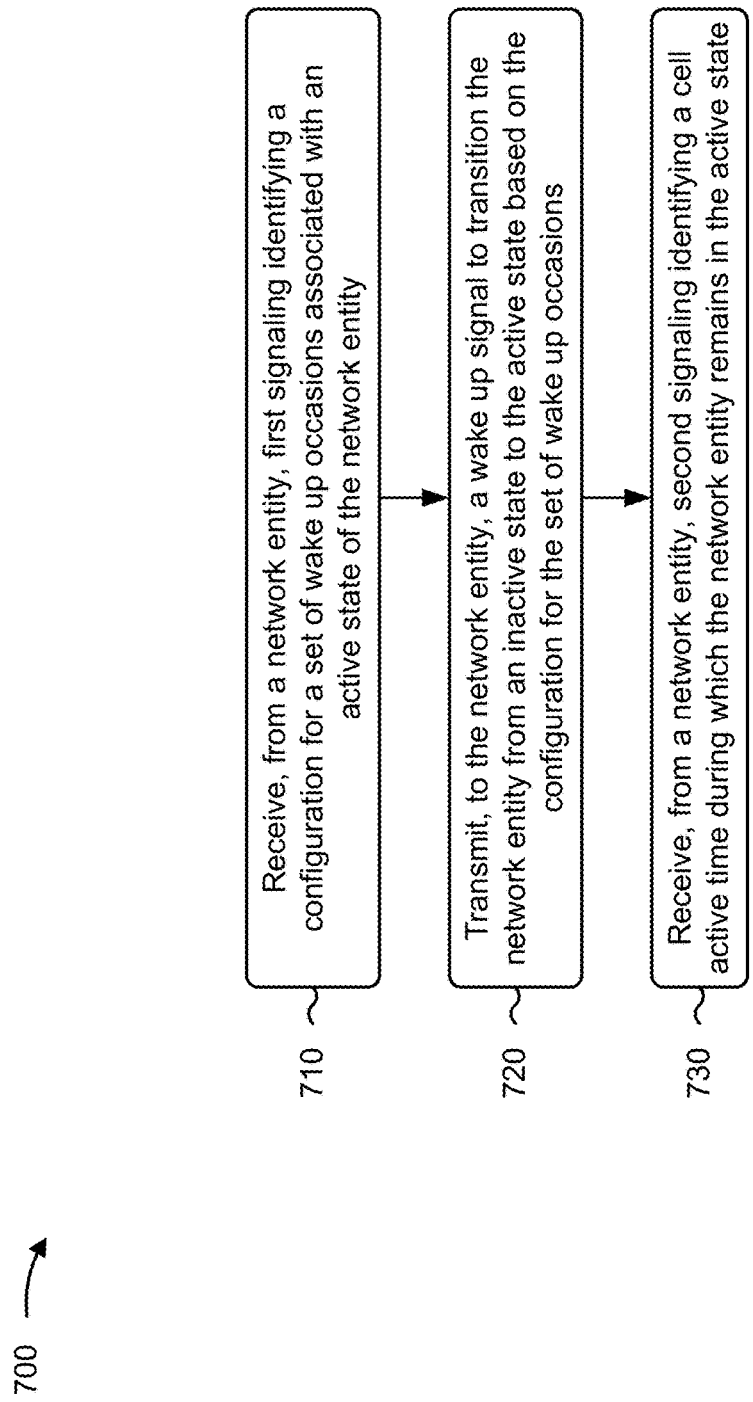
FIGS. 7-8 are diagrams illustrating example processes associated with cell active time configuration, in accordance with the present disclosure.

FIG. 7 is a diagram illustrating an example process 700 performed, for example, by a UE, in accordance with the present disclosure. Example process 700 is an example where the UE (e.g., the UE 120) performs operations associated with cell active time configuration.

As shown in FIG. 7, in some aspects, process 700 may include receiving, from a network entity, first signaling identifying a configuration for a set of wake up occasions associated with an active state of the network entity (block 710). For example, the UE (e.g., using communication manager 140 and/or reception component 902, depicted in FIG. 9) may receive, from a network entity, first signaling identifying a configuration for a set of wake up occasions associated with an active state of the network entity, as described above.

As further shown in FIG. 7, in some aspects, process 700 may include transmitting, to the network entity, a wake up signal to transition the network entity from an inactive state to the active state based on the configuration for the set of wake up occasions (block 720). For example, the UE (e.g., using communication manager 140 and/or transmission component 904, depicted in FIG. 9) may transmit, to the network entity, a wake up signal to transition the network entity from an inactive state to the active state based on the configuration for the set of wake up occasions, as described above.

As further shown in FIG. 7, in some aspects, process 700 may include receiving, from a network entity, second signaling identifying a cell active time during which the network entity remains in the active state (block 730). For example, the UE (e.g., using communication manager 140 and/or reception component 902, depicted in FIG. 9) may receive, from a network entity, second signaling identifying a cell active time during which the network entity remains in the active state, as described above.

Process 700 may include additional aspects, such as any single aspect or any combination of aspects described below and/or in connection with one or more other processes described elsewhere herein.

In a first aspect, process 700 includes suppressing transmission of another wake up signal, to transition the network entity from the inactive state to the active state, during the cell active time based at least in part on receiving the second signaling identifying the cell active time.

In a second aspect, alone or in combination with the first aspect, suppressing the transmission of the wake up signal comprises transmitting, in a resource associated with transmission of the wake up signal, another communication that is different from the wake up signal.

In a third aspect, alone or in combination with one or more of the first and second aspects, suppressing the transmission of the wake up signal comprises forgoing transmission of signaling in a resource associated with transmission of the wake up signal.

In a fourth aspect, alone or in combination with one or more of the first through third aspects, suppressing the transmission of the wake up signal comprises monitoring to receive signaling in a resource associated with transmission of the wake up signal.

In a fifth aspect, alone or in combination with one or more of the first through fourth aspects, the wake up signal is a physical random access channel transmission or a scheduling request transmission.

In a sixth aspect, alone or in combination with one or more of the first through fifth aspects, the cell active time identifies a duration during which the network entity is in the active state, and wherein the duration is identified as at least one of a quantity of slots, a quantity of symbols, or an absolute amount of time.

In a seventh aspect, alone or in combination with one or more of the first through sixth aspects, the configuration for the set of wake up occasions associated with the active state of the network entity includes information identifying a set of possible cell active time durations.

In an eighth aspect, alone or in combination with one or more of the first through seventh aspects, receiving the second signaling identifying the cell active time comprises receiving system information or radio resource control signaling indicating a cell active time duration of the set of possible cell active time durations.

In a ninth aspect, alone or in combination with one or more of the first through eighth aspects, process 700 includes determining the cell active time based at least in part on the second signaling identifying the cell active time.

In a tenth aspect, alone or in combination with one or more of the first through ninth aspects, a subcarrier spacing for determining the cell active time is based at least in part on at least one of a subcarrier spacing of a signal or channel on which the signaling identifying the cell active time is received, a subcarrier spacing of the wake up signal, or a subcarrier spacing received from the network entity.

In an eleventh aspect, alone or in combination with one or more of the first through tenth aspects, a start of the cell active time is based at least in part on at least one of a last symbol of a signal or channel on which the signaling identifying the cell active time is received, a last symbol of the wake up signal, or a configuration received from the network entity.

In a twelfth aspect, alone or in combination with one or more of the first through eleventh aspects, receiving the signaling identifying the cell active time comprises receiving the signaling in at least one of downlinking control information associated with scheduling a paging physical downlink shared channel, a paging message associated with a physical downlink shared channel, a paging early indication message, a dedicated reference signal, or a dedicated channel.

In a thirteenth aspect, alone or in combination with one or more of the first through twelfth aspects, receiving the second signaling identifying the cell active time comprises receiving the second signaling identifying the cell active time in connection with a message of a random access channel procedure.

In a fourteenth aspect, alone or in combination with one or more of the first through thirteenth aspects, the message of the random access channel procedure is at least one of an msg2 message, an msg4 message, or an msgB message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
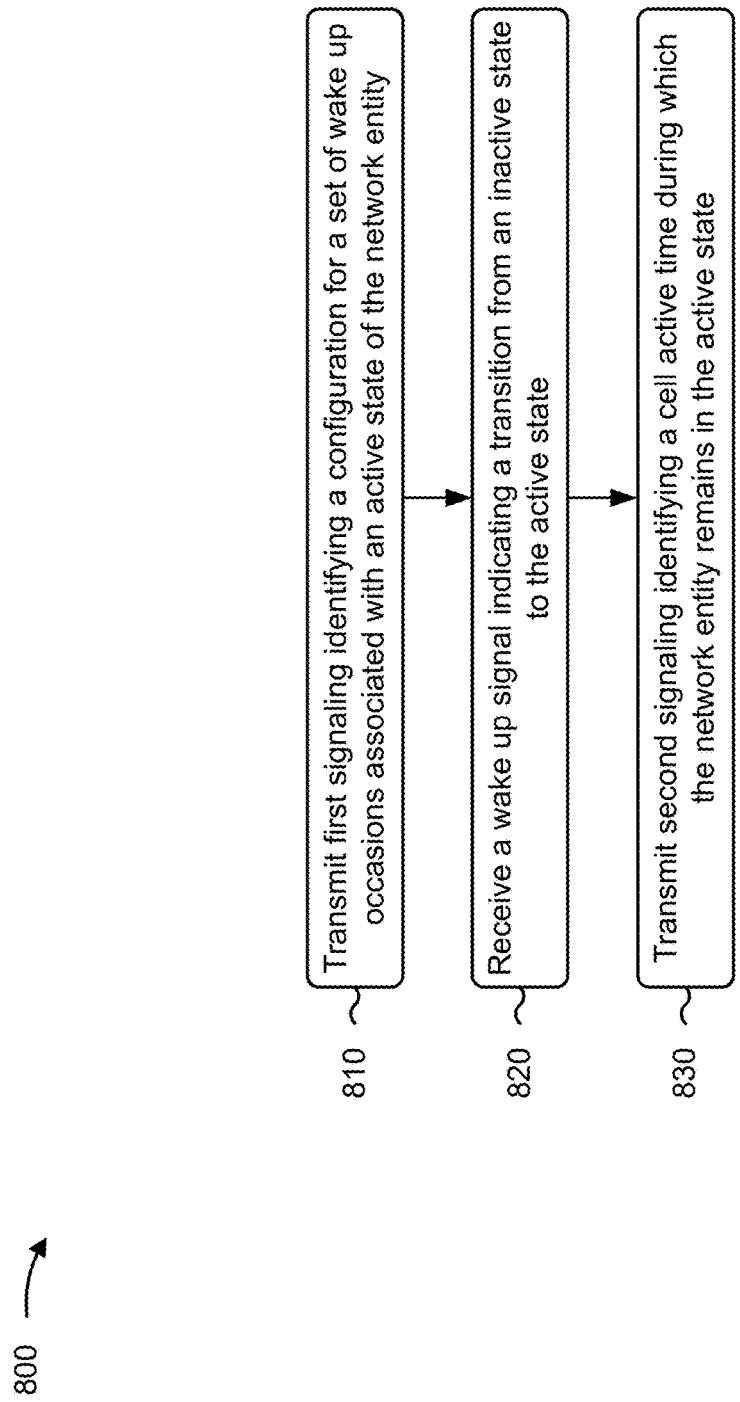

FIG. 8 is a diagram illustrating an example process 800 performed, for example, by a network entity, in accordance with the present disclosure. Example process 800 is an example where the network entity (e.g., the network entity 602, among other examples) performs operations associated with cell active time configuration.

As shown in FIG. 8, in some aspects, process 800 may include transmitting first signaling identifying a configuration for a set of wake up occasions associated with an active state of the network entity (block 810). For example, the network entity (e.g., using communication manager 150 and/or transmission component 1004, depicted in FIG. 10) may transmit first signaling identifying a configuration for a set of wake up occasions associated with an active state of the network entity, as described above.

As further shown in FIG. 8, in some aspects, process 800 may include receiving a wake up signal indicating a transition from an inactive state to the active state (block 820). For example, the network entity (e.g., using communication manager 150 and/or reception component 1002, depicted in FIG. 10) may receive a wake up signal indicating a transition from an inactive state to the active state, as described above.

As further shown in FIG. 8, in some aspects, process 800 may include transmitting second signaling identifying a cell active time during which the network entity remains in the active state (block 830). For example, the network entity (e.g., using communication manager 150 and/or transmission component 1004, depicted in FIG. 10) may transmit second signaling identifying a cell active time during which the network entity remains in the active state, as described above.

Process 800 may include additional aspects, such as any single aspect or any combination of aspects described below and/or in connection with one or more other processes described elsewhere herein.

In a first aspect, the wake up signal is a physical random access channel transmission or a scheduling request transmission.

In a second aspect, alone or in combination with the first aspect, the cell active time identifies a duration during which the network entity is in the active state, and wherein the duration is identified as at least one of a quantity of slots, a quantity of symbols, or an absolute amount of time.

In a third aspect, alone or in combination with one or more of the first and second aspects, the configuration for the set of wake up occasions associated with the active state of the network entity includes information identifying a set of possible cell active time durations.

In a fourth aspect, alone or in combination with one or more of the first through third aspects, transmitting the second signaling identifying the cell active time comprises transmitting system information or radio resource control signaling indicating a cell active time duration of the set of possible cell active time durations.

In a fifth aspect, alone or in combination with one or more of the first through fourth aspects, a subcarrier spacing for the cell active time is based at least in part on at least one of a subcarrier spacing of a signal or channel on which the signaling identifying the cell active time is received, a subcarrier spacing of the wake up signal, or a subcarrier spacing indicated by the network entity.

In a sixth aspect, alone or in combination with one or more of the first through fifth aspects, a start of the cell active time is based at least in part on at least one of a last symbol of a signal or channel on which the signaling identifying the cell active time is received, a last symbol of the wake up signal, or a configuration indicated by the network entity.

In a seventh aspect, alone or in combination with one or more of the first through sixth aspects, transmitting the signaling identifying the cell active time comprises transmitting the signaling in at least one of downlinking control information associated with scheduling a paging physical downlink shared channel, a paging message associated with a physical downlink shared channel, a paging early indication message, a dedicated reference signal, or a dedicated channel.

In an eighth aspect, alone or in combination with one or more of the first through seventh aspects, transmitting the second signaling identifying the cell active time comprises transmitting the second signaling identifying the cell active time in connection with a message of a random access channel procedure.

In a ninth aspect, alone or in combination with one or more of the first through eighth aspects, the message of the random access channel procedure is at least one of an msg2 message, an msg4 message, or an msgB message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
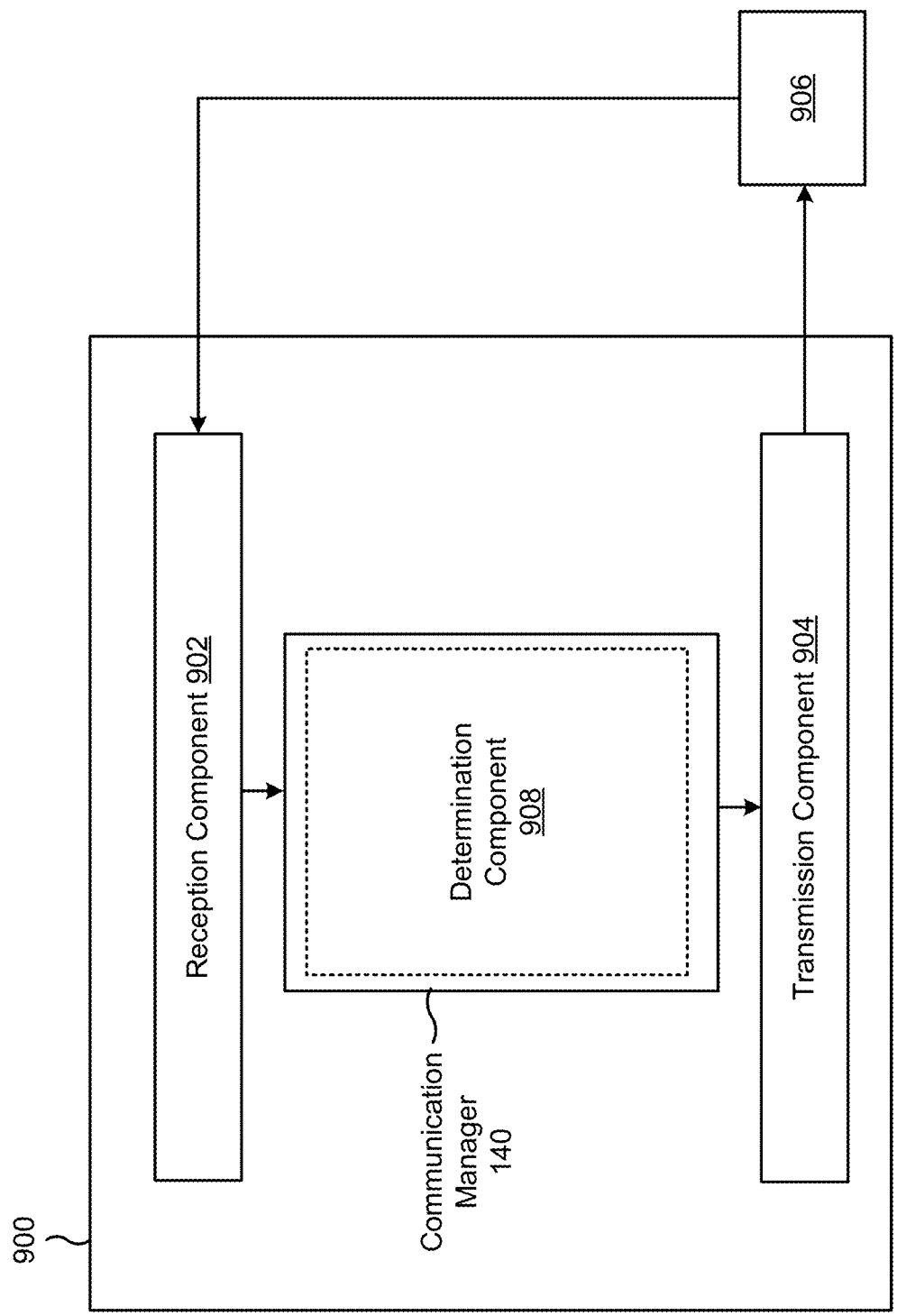
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network entity, first signaling identifying a configuration for a set of wake up occasions associated with an active state of the network entity. The transmission component 904 may transmit, to the network entity, a wake up signal to transition the network entity from an inactive state to the active state based on the configuration for the set of wake up occasions. The reception component 902 may receive, from a network entity, second signaling identifying a cell active time during which the network entity remains in the active state.

The transmission component 904 may suppress transmission of another wake up signal, to transition the network entity from the inactive state to the active state, during the cell active time based at least in part on receiving the second signaling identifying the cell active time. The determination component 908 may determine the cell active time based at least in part on the second signaling identifying the cell active time.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
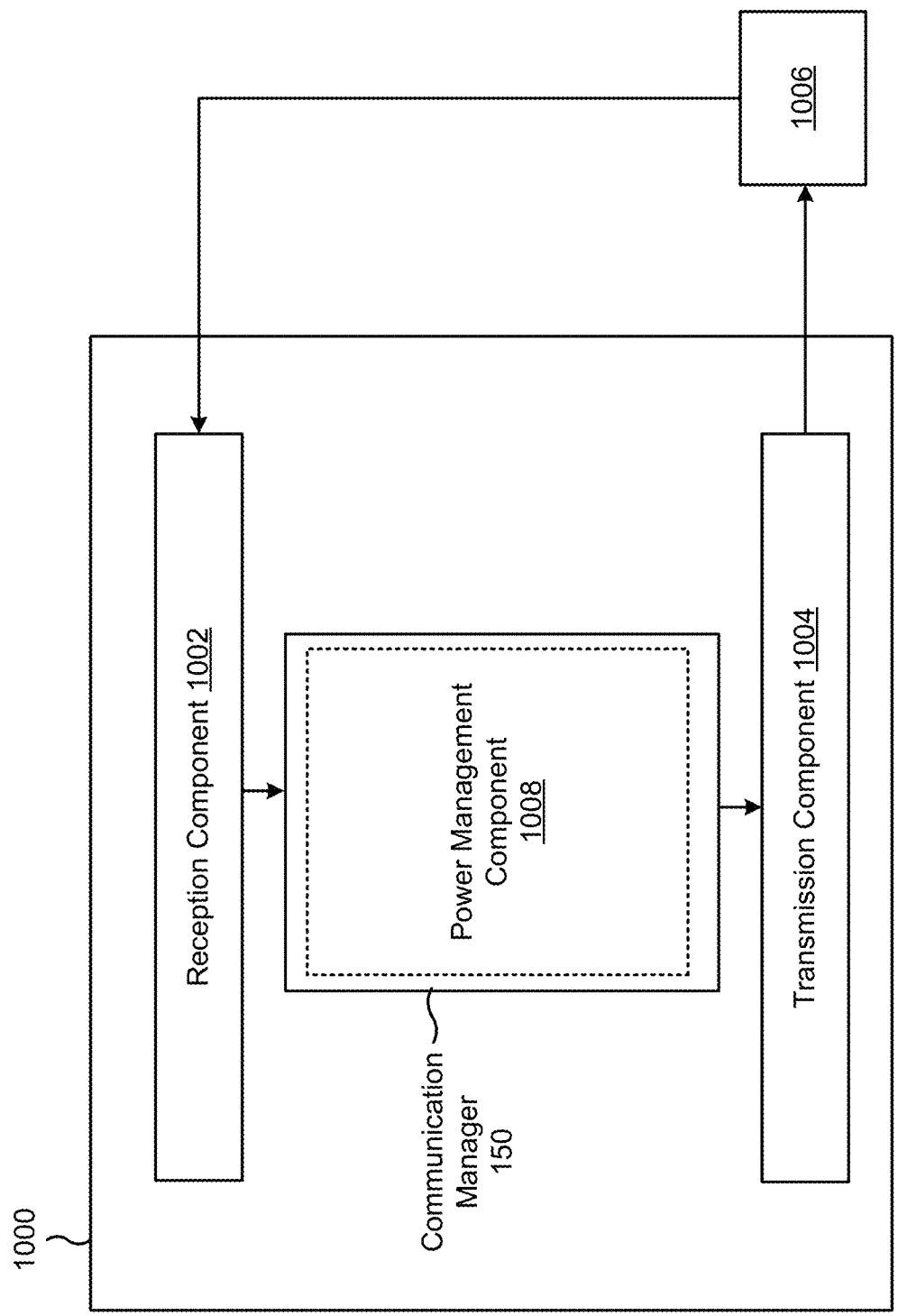

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a power management component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit first signaling identifying a configuration for a set of wake up occasions associated with an active state of the network entity. The reception component 1002 may receive a wake up signal indicating a transition from an inactive state to the active state. The transmission component 1004 may transmit second signaling identifying a cell active time during which the network entity remains in the active state. The power management component 1008 may cause the apparatus 1000 to transition between an inactive or sleep state and an active or awake state.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network entity, first signaling identifying a configuration for a set of wake up occasions associated with an active state of the network entity; transmitting, to the network entity, a wake up signal to transition the network entity from an inactive state to the active state based on the configuration for the set of wake up occasions; and receiving, from a network entity, second signaling identifying a cell active time during which the network entity remains in the active state.

Aspect 2: The method of Aspect 1, further comprising: suppressing transmission of another wake up signal, to transition the network entity from the inactive state to the active state, during the cell active time based at least in part on receiving the second signaling identifying the cell active time.

Aspect 3: The method of Aspect 2, wherein suppressing the transmission of the wake up signal comprises: transmitting, in a resource associated with transmission of the wake up signal, another communication that is different from the wake up signal.

Aspect 4: The method of any of Aspects 2 to 3, wherein suppressing the transmission of the wake up signal comprises: forgoing transmission of signaling in a resource associated with transmission of the wake up signal.

Aspect 5: The method of any of Aspects 2 to 4, wherein suppressing the transmission of the wake up signal comprises: monitoring to receive signaling in a resource associated with transmission of the wake up signal.

Aspect 6: The method of any of Aspects 1 to 5, wherein the wake up signal is a physical random access channel transmission or a scheduling request transmission.

Aspect 7: The method of any of Aspects 1 to 6, wherein the cell active time identifies a duration during which the network entity is in the active state, and wherein the duration is identified as at least one of: a quantity of slots, a quantity of symbols, or an absolute amount of time.

Aspect 8: The method of any of Aspects 1 to 7, wherein the configuration for the set of wake up occasions associated with the active state of the network entity includes information identifying a set of possible cell active time durations.

Aspect 9: The method of Aspect 8, wherein receiving the second signaling identifying the cell active time comprises: receiving system information or radio resource control signaling indicating a cell active time duration of the set of possible cell active time durations.

Aspect 10: The method of any of Aspects 1 to 9, further comprising: determining the cell active time based at least in part on the second signaling identifying the cell active time.

Aspect 11: The method of any of Aspects 1 to 10, wherein a subcarrier spacing for determining the cell active time is based at least in part on at least one of: a subcarrier spacing of a signal or channel on which the signaling identifying the cell active time is received, a subcarrier spacing of the wake up signal, or a subcarrier spacing received from the network entity.

Aspect 12: The method of any of Aspects 1 to 11, wherein a start of the cell active time is based at least in part on at least one of: a last symbol of a signal or channel on which the signaling identifying the cell active time is received, a last symbol of the wake up signal, or a configuration received from the network entity.

Aspect 13: The method of any of Aspects 1 to 12, wherein receiving the signaling identifying the cell active time comprises: receiving the signaling in at least one of: downlink control information associated with scheduling a paging physical downlink shared channel, a paging message associated with a physical downlink shared channel, a paging early indication message, a dedicated reference signal, or a dedicated channel.

Aspect 14: The method of any of Aspects 1 to 13, wherein receiving the second signaling identifying the cell active time comprises: receiving the second signaling identifying the cell active time in connection with a message of a random access channel procedure.

Aspect 15: The method of Aspect 14, wherein the message of the random access channel procedure is at least one of: an msg2 message, an msg4 message, or an msgB message.

Aspect 16: A method of wireless communication performed by a network entity, comprising: transmitting first signaling identifying a configuration for a set of wake up occasions associated with an active state of the network entity; receiving a wake up signal indicating a transition from an inactive state to the active state; and transmitting second signaling identifying a cell active time during which the network entity remains in the active state.

Aspect 17: The method of Aspect 16, wherein the wake up signal is a physical random access channel transmission or a scheduling request transmission.

Aspect 18: The method of any of Aspects 16 to 17, wherein the cell active time identifies a duration during which the network entity is in the active state, and wherein the duration is identified as at least one of: a quantity of slots, a quantity of symbols, or an absolute amount of time.

Aspect 19: The method of any of Aspects 16 to 18, wherein the configuration for the set of wake up occasions associated with the active state of the network entity includes information identifying a set of possible cell active time durations.

Aspect 20: The method of Aspect 19, wherein transmitting the second signaling identifying the cell active time comprises: transmitting system information or radio resource control signaling indicating a cell active time duration of the set of possible cell active time durations.

Aspect 21: The method of any of Aspects 16 to 20, wherein a subcarrier spacing for the cell active time is based at least in part on at least one of: a subcarrier spacing of a signal or channel on which the signaling identifying the cell active time is received, a subcarrier spacing of the wake up signal, or a subcarrier spacing indicated by the network entity.

Aspect 22: The method of any of Aspects 16 to 21, wherein a start of the cell active time is based at least in part on at least one of: a last symbol of a signal or channel on which the signaling identifying the cell active time is received, a last symbol of the wake up signal, or a configuration indicated by the network entity.

Aspect 23: The method of any of Aspects 16 to 22, wherein transmitting the signaling identifying the cell active time comprises: transmitting the signaling in at least one of: downlink control information associated with scheduling a paging physical downlink shared channel, a paging message associated with a physical downlink shared channel, a paging early indication message, a dedicated reference signal, or a dedicated channel.

Aspect 24: The method of any of Aspects 16 to 23, wherein transmitting the second signaling identifying the cell active time comprises: transmitting the second signaling identifying the cell active time in connection with a message of a random access channel procedure.

Aspect 25: The method of Aspect 24, wherein the message of the random access channel procedure is at least one of: an msg2 message, an msg4 message, or an msgB message.

Aspect 26: An apparatus for wireless communication at a device, comprising a processor; memory coupled with the processor; and instructions stored in the memory and executable by the processor to cause the apparatus to perform the method of one or more of Aspects 1-15.

Aspect 27: A device for wireless communication, comprising a memory and one or more processors coupled to the memory, the one or more processors configured to perform the method of one or more of Aspects 1-15.

Aspect 28: An apparatus for wireless communication, comprising at least one means for performing the method of one or more of Aspects 1-15.

Aspect 29: A non-transitory computer-readable medium storing code for wireless communication, the code comprising instructions executable by a processor to perform the method of one or more of Aspects 1-15.

Aspect 30: A non-transitory computer-readable medium storing a set of instructions for wireless communication, the set of instructions comprising one or more instructions that, when executed by one or more processors of a device, cause the device to perform the method of one or more of Aspects 1-15.

Aspect 31: An apparatus for wireless communication at a device, comprising a processor; memory coupled with the processor; and instructions stored in the memory and executable by the processor to cause the apparatus to perform the method of one or more of Aspects 16-25.

Aspect 32: A device for wireless communication, comprising a memory and one or more processors coupled to the memory, the one or more processors configured to perform the method of one or more of Aspects 16-25.

Aspect 33: An apparatus for wireless communication, comprising at least one means for performing the method of one or more of Aspects 16-25.

Aspect 34: A non-transitory computer-readable medium storing code for wireless communication, the code comprising instructions executable by a processor to perform the method of one or more of Aspects 16-25.

Aspect 35: A non-transitory computer-readable medium storing a set of instructions for wireless communication, the set of instructions comprising one or more instructions that, when executed by one or more processors of a device, cause the device to perform the method of one or more of Aspects 16-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network entity, first signaling identifying a configuration for a set of wake up occasions associated with an active state of the network entity;
      transmit, to the network entity, a wake up signal to transition the network entity from an inactive state to the active state based on the configuration for the set of wake up occasions; and
      receive, from the network entity, second signaling identifying a cell active time during which the network entity remains in the active state.

2. The UE of claim 1, wherein the one or more processors are further configured to:
   suppress transmission of another wake up signal, to transition the network entity from the inactive state to the active state, during the cell active time based at least in part on receiving the second signaling identifying the cell active time.

3. The UE of claim 2, wherein the one or more processors, to suppress the transmission of the wake up signal, are configured to:
   transmit, in a resource associated with transmission of the wake up signal, another communication that is different from the wake up signal.

4. The UE of claim 2, wherein the one or more processors, to suppress the transmission of the wake up signal, are configured to:
   forgo transmission of signaling in a resource associated with transmission of the wake up signal.

5. The UE of claim 2, wherein the one or more processors, to suppress the transmission of the wake up signal, are configured to:
   monitor to receive signaling in a resource associated with transmission of the wake up signal.

6. The UE of claim 1, wherein the wake up signal is a physical random access channel transmission or a scheduling request transmission.

7. The UE of claim 1, wherein the cell active time identifies a duration during which the network entity is in the active state, and
   wherein the duration is identified as at least one of:
      a quantity of slots,
      a quantity of symbols, or
      an absolute amount of time.

8. The UE of claim 1, wherein the configuration for the set of wake up occasions associated with the active state of the network entity includes information identifying a set of possible cell active time durations.

9. The UE of claim 8, wherein the one or more processors, to receive the second signaling identifying the cell active time, are configured to:
   receive system information or radio resource control signaling indicating a cell active time duration of the set of possible cell active time durations.

10. The UE of claim 1, wherein the one or more processors are further configured to:

determine the cell active time based at least in part on the second signaling identifying the cell active time.

11. The UE of claim 1, wherein a subcarrier spacing for determining the cell active time is based at least in part on at least one of:
a subcarrier spacing of a signal or channel on which the signaling identifying the cell active time is received,
a subcarrier spacing of the wake up signal, or
a subcarrier spacing received from the network entity.

12. The UE of claim 1, wherein a start of the cell active time is based at least in part on at least one of:
a last symbol of a signal or channel on which the signaling identifying the cell active time is received,
a last symbol of the wake up signal, or
a configuration received from the network entity.

13. The UE of claim 1, wherein the one or more processors, to receive the signaling identifying the cell active time, are configured to:
receive the signaling in at least one of:
downlink control information associated with scheduling a paging physical downlink shared channel,
a paging message associated with a physical downlink shared channel,
a paging early indication message,
a dedicated reference signal, or
a dedicated channel.

14. The UE of claim 1, wherein the one or more processors, to receive the second signaling identifying the cell active time, are configured to:
receive the second signaling identifying the cell active time in connection with a message of a random access channel procedure.

15. The UE of claim 14, wherein the message of the random access channel procedure is at least one of:
an msg2 message,
an msg4 message, or
an msgB message.

16. A network entity for wireless communication, comprising:
one or more memories; and
one or more processors, coupled to the one or more memories, configured to:
transmit first signaling identifying a configuration for a set of wake up occasions associated with an active state of the network entity;
receive a wake up signal indicating a transition from an inactive state to the active state; and
transmit second signaling identifying a cell active time during which the network entity remains in the active state.

17. The network entity of claim 16, wherein the wake up signal is a physical random access channel transmission or a scheduling request transmission.

18. The network entity of claim 16, wherein the cell active time identifies a duration during which the network entity is in the active state, and
wherein the duration is identified as at least one of:
a quantity of slots,
a quantity of symbols, or
an absolute amount of time.

19. The network entity of claim 16, wherein the configuration for the set of wake up occasions associated with the active state of the network entity includes information identifying a set of possible cell active time durations.

20. The network entity of claim 19, wherein the one or more processors, to transmit the second signaling identifying the cell active time, are configured to:
transmit system information or radio resource control signaling indicating a cell active time duration of the set of possible cell active time durations.

21. The network entity of claim 16, wherein a subcarrier spacing for the cell active time is based at least in part on at least one of:
a subcarrier spacing of a signal or channel on which the signaling identifying the cell active time is received,
a subcarrier spacing of the wake up signal, or
a subcarrier spacing indicated by the network entity.

22. The network entity of claim 16, wherein a start of the cell active time is based at least in part on at least one of:
a last symbol of a signal or channel on which the signaling identifying the cell active time is received,
a last symbol of the wake up signal, or
a configuration indicated by the network entity.

23. The network entity of claim 16, wherein the one or more processors, to transmit the signaling identifying the cell active time, are configured to:
transmit the signaling in at least one of:
downlink control information associated with scheduling a paging physical downlink shared channel,
a paging message associated with a physical downlink shared channel,
a paging early indication message,
a dedicated reference signal, or
a dedicated channel.

24. The network entity of claim 16, wherein the one or more processors, to transmit the second signaling identifying the cell active time, are configured to:
transmit the second signaling identifying the cell active time in connection with a message of a random access channel procedure.

25. The network entity of claim 24, wherein the message of the random access channel procedure is at least one of:
an msg2 message,
an msg4 message, or
an msgB message.

26. A method of wireless communication performed by a user equipment (UE), comprising:
receiving, from a network entity, first signaling identifying a configuration for a set of wake up occasions associated with an active state of the network entity;
transmitting, to the network entity, a wake up signal to transition the network entity from an inactive state to the active state based on the configuration for the set of wake up occasions; and
receiving, from the network entity, second signaling identifying a cell active time during which the network entity remains in the active state.

27. The method of claim 26, further comprising:
suppressing transmission of another wake up signal, to transition the network entity from the inactive state to the active state, during the cell active time based at least in part on receiving the second signaling identifying the cell active time.

28. The method of claim 27, wherein suppressing the transmission of the wake up signal comprises:
transmitting, in a resource associated with transmission of the wake up signal, another communication that is different from the wake up signal.

29. A method of wireless communication performed by a network entity, comprising:
transmitting first signaling identifying a configuration for a set of wake up occasions associated with an active state of the network entity;

receiving a wake up signal indicating a transition from an inactive state to the active state; and transmitting second signaling identifying a cell active time during which the network entity remains in the active state.

30. The method of claim 29, wherein the wake up signal is a physical random access channel transmission or a scheduling request transmission.

* * * * *